US008666795B2

(12) United States Patent
Cameron et al.

(10) Patent No.: US 8,666,795 B2
(45) Date of Patent: *Mar. 4, 2014

(54) SYSTEMS AND METHODS OF AUTOMATICALLY SCHEDULING A WORKFORCE

(71) Applicant: Verint Systems Inc., Melville, NY (US)

(72) Inventors: Jeffrey Cameron, San Diego, CA (US); Ufuk Kilinc, San Diego, CA (US); Abhyuday Desai, San Diego, CA (US)

(73) Assignee: Verint Systems Inc., Melville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/680,454

(22) Filed: Nov. 19, 2012

(65) Prior Publication Data
US 2013/0080202 A1 Mar. 28, 2013

Related U.S. Application Data

(63) Continuation of application No. 11/831,250, filed on Jul. 31, 2007, now Pat. No. 8,315,901.

(60) Provisional application No. 60/940,952, filed on May 30, 2007.

(51) Int. Cl.
G06Q 10/00 (2012.01)

(52) U.S. Cl.
USPC .......................................... 705/7.16

(58) Field of Classification Search
USPC ................................................ 705/7.12, 7.13
See application file for complete search history.

(56) References Cited

U.S. PATENT DOCUMENTS

| 5,111,391 | A | * | 5/1992 | Fields et al. | 705/7.14 |
| 5,911,134 | A | * | 6/1999 | Castonguay et al. | 705/7.12 |
| 6,587,831 | B1 | * | 7/2003 | O'Brien | 705/7.16 |
| 6,985,872 | B2 | * | 1/2006 | Benbassat et al. | 705/7.14 |
| 2004/0010437 | A1 | * | 1/2004 | Kiran et al. | 705/8 |
| 2004/0078257 | A1 | * | 4/2004 | Schweitzer et al. | 705/9 |
| 2004/0267591 | A1 | * | 12/2004 | Hedlund et al. | 705/9 |
| 2005/0004828 | A1 | * | 1/2005 | deSilva et al. | 705/9 |
| 2005/0096962 | A1 | * | 5/2005 | Narasimhan et al. | 705/9 |
| 2007/0260506 | A1 | * | 11/2007 | Fitzpatrick et al. | 705/11 |

* cited by examiner

Primary Examiner — Johnna Loftis
(74) Attorney, Agent, or Firm — Andrus Intellectual Property Law, LLP

(57) ABSTRACT

Systems and methods of workforce scheduling are disclosed. One example embodiment, among others, comprises a computer-implemented method of scheduling workers. Each worker is associated with one of a set of flexibility classifications, which include non-flex-time and at least one flex-time. The method includes generating a set of shift instances to cover forecasted demand over a planning period, and assigning the shift instances to the set of workers by iterating through the each of the workers to assign at least a portion of the shift instances to a selected one of the workers. The assigning is such that total hours assigned to the selected worker depends on a number associated with the classification of the selected worker.

14 Claims, 12 Drawing Sheets

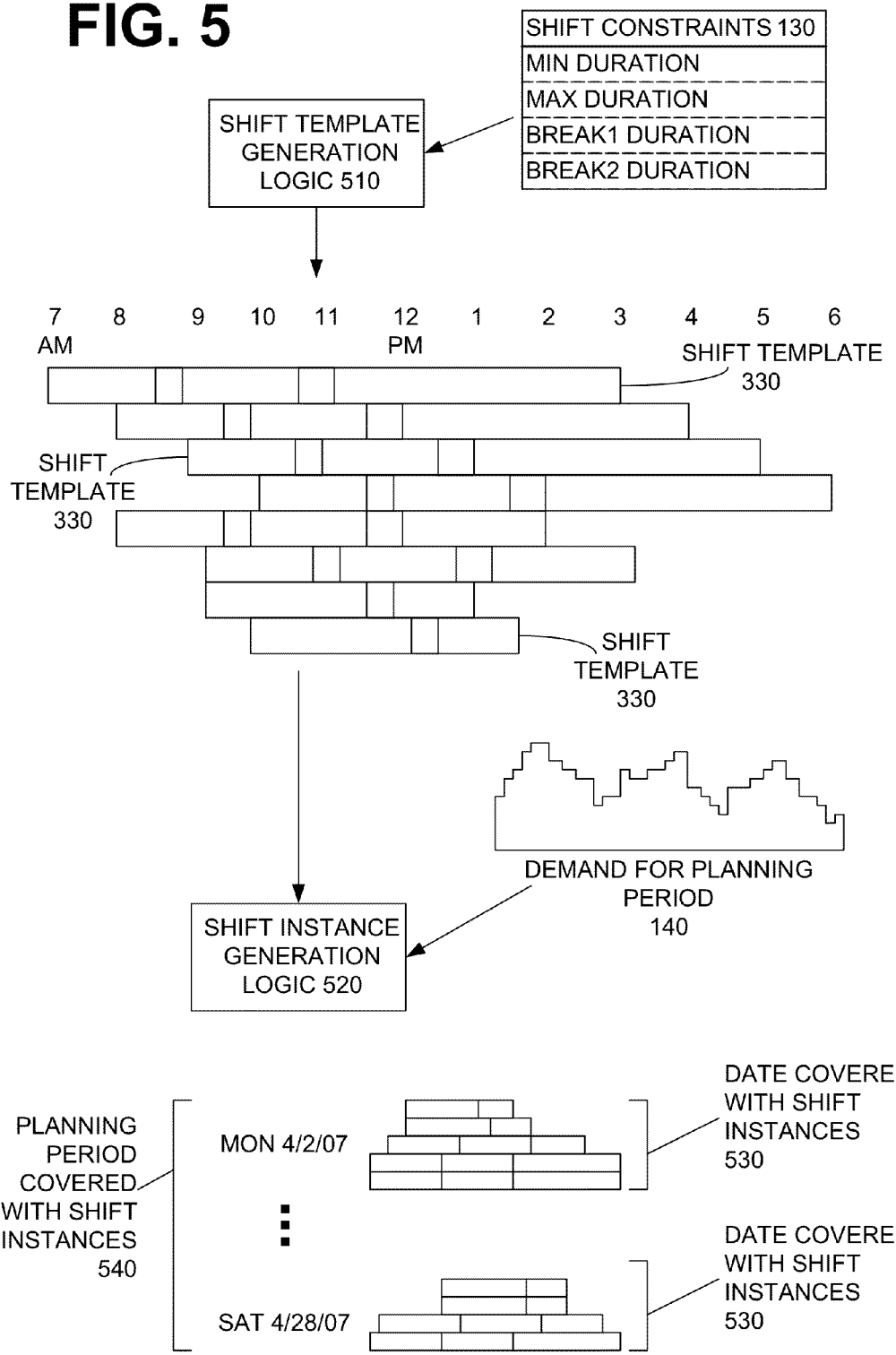

SYSTEMS AND METHODS OF AUTOMATICALLY SCHEDULING A WORKFORCE

CROSS-REFERENCE TO RELATED APPLICATION

This application is a continuation application of and claims priority to U.S. Pat. application Ser. No. 11/831,250, filed Jul. 31, 2007, which further claims priority to U.S. Provisional No. 60/940,952, filed May 30, 2007, and which is hereby incorporated by reference in its entirety. No new matter has been added.

FIELD OF THE DISCLOSURE

The present disclosure relates to scheduling, and more specifically, to automatically scheduling a workforce.

DESCRIPTION OF THE RELATED ART

In many enterprises a typical workforce includes workers with a fixed number of hours and workers with a flexible number of hours. Existing software can help a user plan how many of each type of worker will be needed to handle a predicted amount of demand over a planning period, such as a quarter. However, conventional planning software uses a trial-and-error approach in determining how many flexible workers are needed.

In this trial-and-error approach, a user runs a first scenario, specifying a particular number of full-time workers and a particular number of part-time workers. The planning software generates a staffing plan for this scenario, with a computed number of flexible workers. The user then runs another scenario, specifying a different number of full-time and part-time workers. This process of running multiple scenarios and then comparing them to determine a staffing plan that's appropriate for the enterprise is cumbersome and time-consuming. Thus, a need arises for these and other problems to be addressed.

SUMMARY

Systems and methods of automatically scheduling a workforce are disclosed. One exemplary method of scheduling a set of workers includes receiving a set of shift constraints, creating a set of shift templates representing all variations allowed by the shift constraints, determining a number of instances of each shift template to cover forecasted demand over a planning period including a set of scheduling intervals, and creating the determined number of shifts instances. Each worker has one of a set of flexibility classifications including a flex-time classification and a non-flex-time classification. The method further includes producing a set of staff mix enumerations to cover the shift instances. The set of enumerations varies from a first enumeration to a last enumeration. The first enumeration includes zero workers of a non-flex-time classification and a first computed number of workers of a flex-time classification. The last enumeration includes a maximum number of workers of a non-flex-time classification and a last computed number of workers of a flex-time classification. The producing step further includes assigning shift instances to the set of workers by an iteration through workers. The iteration comprises applying dynamic programming to assign shift instances within the scheduling interval to a selected one of the workers, such that total hours assigned to the selected worker approach, but do not exceed, a per-interval maximum associated with the classification of the selected worker. The workers having a classification other than flex-time are selected before workers having a flex-time classification.

Another exemplary method of scheduling a set of workers includes generating shift instances to cover forecasted demand over a planning period. The method further includes producing a set of staff mix enumerations to cover the shift instances. The method further includes assigning the shift instances to the set of workers by an iteration. The iteration includes assigning the shift instances to a selected one of the workers. The total hours assigned to the selected worker depends on a number corresponding to the classification of the selected worker. Workers having a classification other than flex-time are selected before workers having a flex-time classification.

An exemplary system of scheduling a set of workers comprises logic configured to generate a set of shift instances to cover forecasted demand over a planning period, and logic configured to assign shift instances to the set of workers. Each worker has one of a set of flexibility classifications including a flex-time classification. The logic configured to assign iterates through the each of the workers to assign at least a portion of the shift instances to a selected one of the workers. The total hours assigned to the selected worker depends on a number that is associated with the classification of the selected worker.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 5 is a data flow diagram of embodiments of the template generation block and the shift instance generation block of FIG. 4.

DETAILED DESCRIPTION

Figure 1:
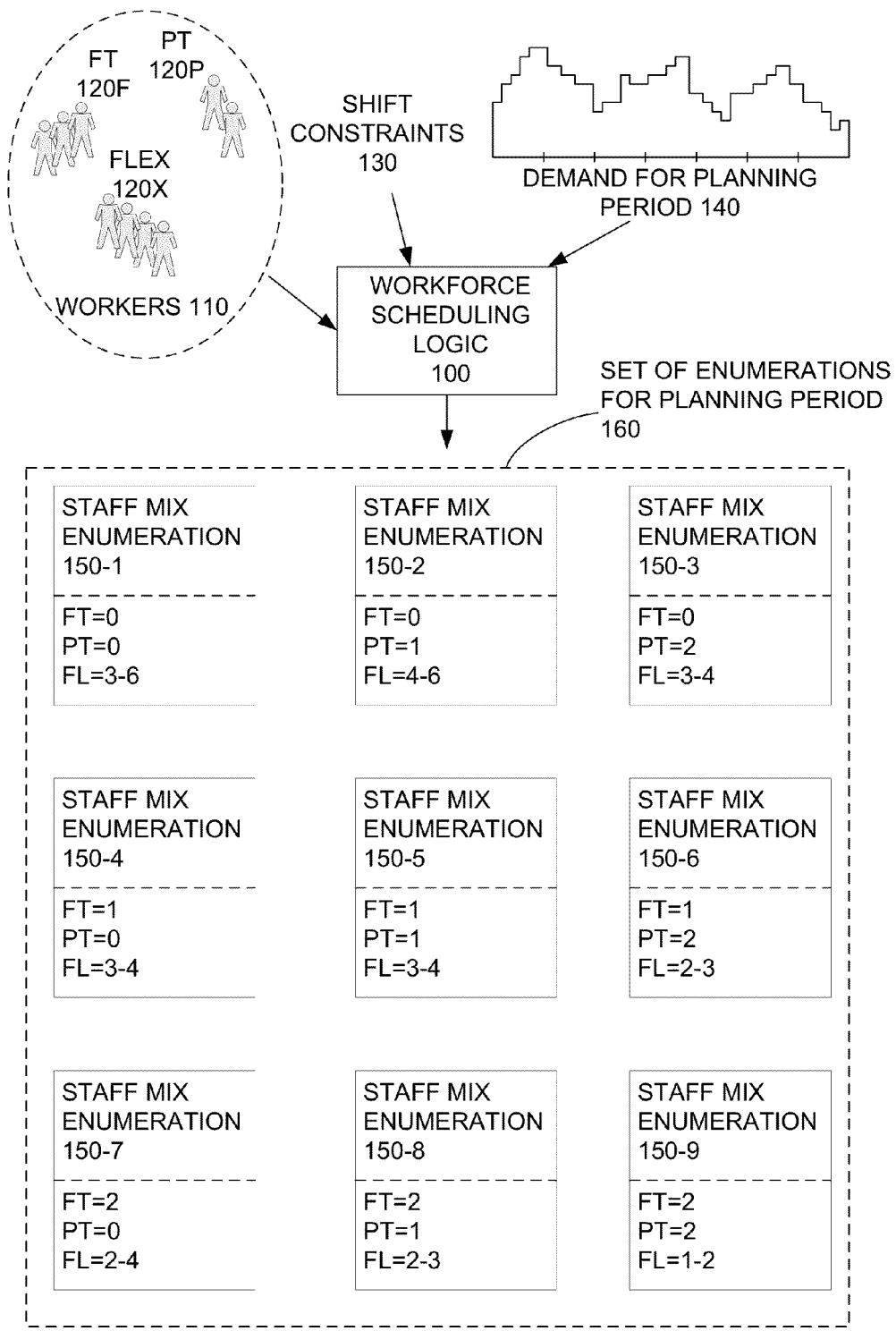
FIG. 1 is a data flow diagram of one embodiment of the workforce scheduling logic of FIG. 1.

FIG. 1 is a data flow diagram of one embodiment of logic for automatically scheduling a workforce 100. One input to logic for automatically scheduling a workforce 100 is a description of workers 110, where each of workers 110 are classified based on a minimum and a maximum number of hours that the worker 110 is expected to work in a given scheduling period (e.g., a week). One or more of the classifications are non-flexible, i.e., the scheduler attempts to assign shifts to meet these minimums and maximums. The example of FIG. 1 shows two non-flexible classifications, full time (FT 120F) and part time (PT 120P), where the maximum number of hours for full time classification FT 120F is greater than the maximum number of hours for part time classification PT 120P. Other embodiments are contemplated which use different numbers of non-flexible classifications. When scheduling workers in non-flexible classifications, the order of precedence is based on maximum weekly hours: classifications with greater weekly hours are scheduled before the ones with lower weekly hours.

One of the classifications (flexible 120X) allows the employer to schedule a flexible amount of hours for the worker 110. Flexible workers are scheduled with the lowest priority, and act as gap fillers who take on the shifts that were unable to be assigned to non-flexible employees. Using inventive techniques disclosed herein, logic for automatically scheduling a workforce 100 determines, for each division of the planning period, the number of flexible employees needed to cover demand, given a specific number of non-flexible employees This process is iterated for various numbers of non-flexible employees, and determines, for each, the number of flexible employees needed to cover demand. A particular number of non-flexible workers, and the associated (computed) number of flexible workers, will be referred to herein as an "enumeration". Logic 100 produces ranges for the number of flexible employees for each enumeration. Some embodiments also produce per-enumeration statistics for the count of flexible workers (e.g., average, minimum, maximum).

The description of workers 110 includes the number of workers in each classification, and definitions of the classifications. Note that the description of workers 110 is not required to identify specific individual workers, because logic for automatically scheduling a workforce 100 treats workers of the same classification as equivalents. Thus, workers 110 can be viewed as "virtual" workers or generic instances of a worker classification.

Another input to logic for automatically scheduling a workforce 100 is one or more shift constraints 130. A person of ordinary skill in the art should be familiar with the concept of a "shift"—for instance, a portion of a defined period (e.g., 24-hour period) that a worker 110 is scheduled, or assigned, to work. Examples of shifts are 8 AM to 5 PM, 9 AM to 5 PM, and 12 AM to 6 AM. A shift constraint 130 describes how a shift is limited, for example, in duration (an 8 hour shift, a 6 hour shift), in start time (9 AM or earlier), or in stop time (before 11 PM). Other examples of shift constraints 130 include break times and durations (e.g., an 8 hour shift includes a thirty-minute lunch break and a fifteen-minute morning break).

Another input to logic 100 is a forecasted or predicted demand 140 for workers 110 during a particular planning period. The granularity of demand 140 (i.e., the demand interval) is generally less than a day, and more typically demand 140 is predicted on an hourly basis.

After receiving inputs, logic for automatically scheduling a workforce 100 generates shift assignments to cover predicted demand 140 for each scheduling interval in the planning period. Logic 100 schedules workers 110 to handle predicted demand 140, while attempting to minimize under-staffing of each worker on an individual basis. Each classification is defined by at least one number of hours per interval (e.g., day, week, month). In some embodiments, the definition includes a maximum number of hours per interval and a minimum number of hours per interval. The total number of hours assigned to a worker by logic 100 depends on one or more of these number of hours per interval as defined by the worker's classification. In one embodiment, logic for automatically scheduling a workforce 100 attempts to assign workers 110 to shifts such that the number of hours assigned to individual workers comes close to, but does not exceed, the maximum hours per week for their classification. In another embodiment, logic for automatically scheduling a workforce 100 attempts to assign workers 110 to shifts such that the number of hours assigned to individual workers exceeds the minimum hours per week for their classification, and approaches but does not exceed the maximum hours per week for their classification.

Logic for automatically scheduling a workforce 100 uses inventive techniques (described in more detail later) to determine the number of workers of a flexible classification that are needed to handle predicted demand in a scheduling period, given a fixed number of workers in a non-flexible classification (or classifications). Furthermore, logic for automatically scheduling a workforce 100 generates multiple potential schedules—multiple shift assignments for the same scheduling interval—varying in the number of workers drawn from each classification. Each schedule thus contains a specific count of workers in each classification, and this count of workers in each classification combines to form a staff mix enumeration 150. By generating a set (160) of multiple staff mix enumerations 150 for the planning period, logic for automatically scheduling a workforce 100 gives planner personnel and/or software more flexibility in deciding which particular staff mix enumeration is appropriate.

Notably, the staff mix enumerations 150 generated by logic for automatically scheduling a workforce 100 follow a pattern. In the example scenario of FIG. 1, the first enumeration for week X (150-1) includes zero workers in the full time classification, zero workers in the part time classification, and a computed range of workers in the flexible classification (here, the computed range is 3-6). Thus, the enumeration takes the form $(0, 0, X_{00})$. The next enumeration has the form $(0, 1, X_{01})$: zero workers in the full time classification, one worker in the part time classification, and a computed range of workers in the flexible classification. The next enumeration has the form $(1, 1, X_{02})$: zero workers in the full time classification, one worker in the part time classification, and a computed range of workers in the flexible classification. The last enumeration has the form $(M_f, M_p, X_{M_f M_p})$, where $M_f$ is the total number of workers in the full time classification, and $M_p$ is the total number of workers 110 in the part time classification. It will be appreciated that the set of enumerations 150 for three classifications can thus be generalized as $$(0, 0, X_{00}), (0, 1, X_{01}), \ldots (0, M_p, X_{0M_p}),$$

$$(1, 0, X_{10}), (1, 1, X_{11}), \ldots (1, M_p, X_{1M_p}),$$

$$\ldots$$

$$(M_f, 0, X_{M_p 0}), (M_f, 1, X_{M_f 1}) \ldots (M_f, M_P, X_{M_f M_p})$$

Although the example scenario of FIG. 1 has one flexible classification and two non-flexible classifications (full time and part time), other embodiments of logic for automatically scheduling a workforce 100 are contemplated which handle more than one non-flexible classification.

Figure 2:
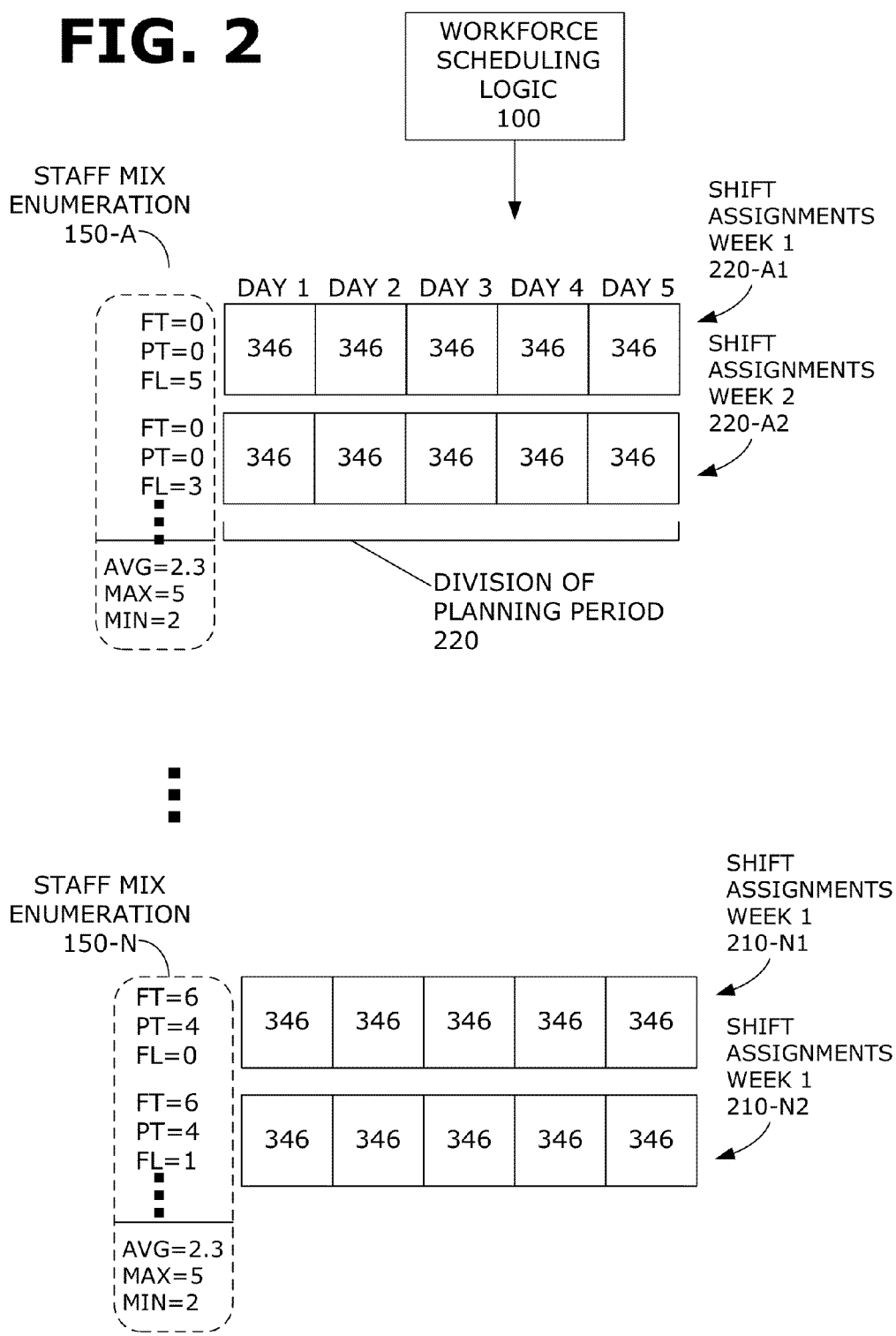
FIG. 2 is another data flow diagram of one embodiment of the workforce scheduling logic of FIG. 1, in which staff mix enumerations from FIG. 1 are shown in further detail.

FIG. 2 is another data flow diagram of one embodiment of logic for automatically scheduling a workforce 100, in which staff mix enumerations 150 are shown in further detail. As explained above, logic 100 generates multiple staff mix enumerations 150 for the planning period, varying in the number of workers drawn from each classification. Each particular staff mix enumeration 150 comprises a fixed number of workers (P, F) in each non-flexible classification (PT 120P, FT 120F) and computed range of workers in the flexible classification (120X). The range results from the fact that each planning period has multiple divisions (e.g., multiple weeks), and each division has a specific number of flexible workers. In the embodiment of FIG. 2, logic 100 also computes an average number of flex time workers for the enumeration 150, along with the maximum and minimum. In the example scenario of FIG. 2, staff mix enumeration 150-A has 0 full time workers, 0 part time workers, and 3-5 flex-time workers, while staff mix enumeration 150-N has 6 full time workers, 4 part time workers, and 0-1 flex-time workers. Although not illustrated in FIG. 2, logic 100 also generates additional staff mix enumerations between 150-A and 150-N, (i.e., $[0,1,X_{01}]$, $[0,2,X_{02}]$, etc.)

Each staff mix enumeration 150 is associated with a shift assignment 210 for each division 220 in the planning period. Thus, staff mix enumeration 150-A is associated with shift assignment 210-A1 (week 1) and shift assignment 210-A2 (week 2). Staff mix enumeration 150-N is associated with shift assignment 210-N1 (week 1) and shift assignment 210-N2 (week 2). In this example embodiment, division 220 is a week, but other embodiments may use a different interval, for example, a biweek. Furthermore, although FIG. 2 is simplified to show assignments for only two weeks (Day 1 through Day 5), logic 100 generates additional shift assignments (not shown) to cover all divisions 220 in the planning period.

Logic for automatically scheduling a workforce 100 generates multiple shift assignments 210 for each scheduling interval in a planning period, where each shift assignment 210 corresponds to the same planning period division but includes different numbers of workers of each classification. The number of workers in each classification is a staff mix enumeration 150. Therefore, logic for automatically scheduling a workforce 100 can also be viewed as generating multiple staff mix enumerations 150 for the same planning period, where each enumeration 150 includes a shift assignment 210 for the planning period.

The inventive processes used by logic for automatically scheduling a workforce 100 to generate staff mix enumerations will be described in further detail below. Before describing those processes, however, various software objects or data structures used by some embodiments of logic for automatically scheduling a workforce 100 will now be described in connection with the object diagram of FIG. 3.

In one embodiment, demand 140 is predicted daily. A shift assignment 210 is associated with, or occurs during, a calendar week 310. Shift assignment 210 is a collection of shift instances 320, where each shift instance 320 is described by a time range (e.g., 9 AM to 5 PM) and a date. Each shift instance 320 may be assigned to one worker 110, or may be unassigned. A worker 110 can have more than one shift instance 320 in shift assignment 210 assigned to him (e.g., he works Monday 8-4 and Friday 8-4). However, a shift instance 320 cannot be assigned to more than one worker: three workers scheduled for a Monday, Apr. 3, 2007, 8-5 are represented by three separate shift instances 320, each associated with an individual worker, rather than by a single Monday, Apr. 3, 2007, 8-5 "shift".

Shift constraints 130 describe how a shift instance 320 is limited (e.g., duration, start time, stop time, break times, break durations). Multiple shift instances 320 can be created based on shift constraints 130, by varying attributes such as duration, start time, etc. As explained in further detail below, logic for automatically scheduling a workforce 100 determines how many of each possible variation of a shift (as allowed by shift constraints 130) are needed to cover demand 140, and creates an appropriate number of shift instances 320 based on shift constraints 130. For example, demand for day X may be highest around lunchtime, so that logic 100 creates two 9 AM to 5 PM shifts and two 11 AM to 3 PM shifts to handle the increased demand during lunch.

In some embodiments, the relationship between shift instance 320 and shift constraints 130 is indirect, through a shift template 330. (In FIG. 3, shift template 330 is shown with dotted lines to indicate that it is optional.) In such embodiments, a complete set of shift templates 330 is created representing all possible variations allowed by shift constraints 130. Logic for automatically scheduling a workforce 100 then determines how many of each variation of a shift template 330 are needed to cover demand 140, and creates that number of shift instances 320. Using the same example Day X from above, shift templates 330 might include: two eight hour shift templates, one being 8 AM to 4 PM and the other being 9 AM to 5 PM; a six hour template from 9 AM to 3 PM; and two four hour templates, one being 10 AM to 2 PM and the other 11 AM to 3 PM. Then logic 100 might create two shifts from the 9 AM to 5 PM template, and two shifts from the 11 AM to 3 PM template.

A worker 110 has a classification 120 that is based on a minimum and a maximum number of hours that the worker 110 is expected to work in each scheduling period. As described above, multiple classifications 120 exist. For at least one non-flexible classification, logic 100 attempts to assign shifts so that the number of hours assigned to non-flexible workers is between the minimum and a maximum defined by the classification. (In FIG. 1, full time classification FT 120F and part time classification PT 120P are both non-flexible.) For at least one other classification, logic 100 allows a flexible amount of hours to be assigned to the worker 110. (In FIG. 1, classification 120X is flexible.) As described above, a per-classification count of the number of workers in the shift assignment 210 is tracked as a staff mix enumeration 150 associated with the shift assignment 210.

Figure 3:
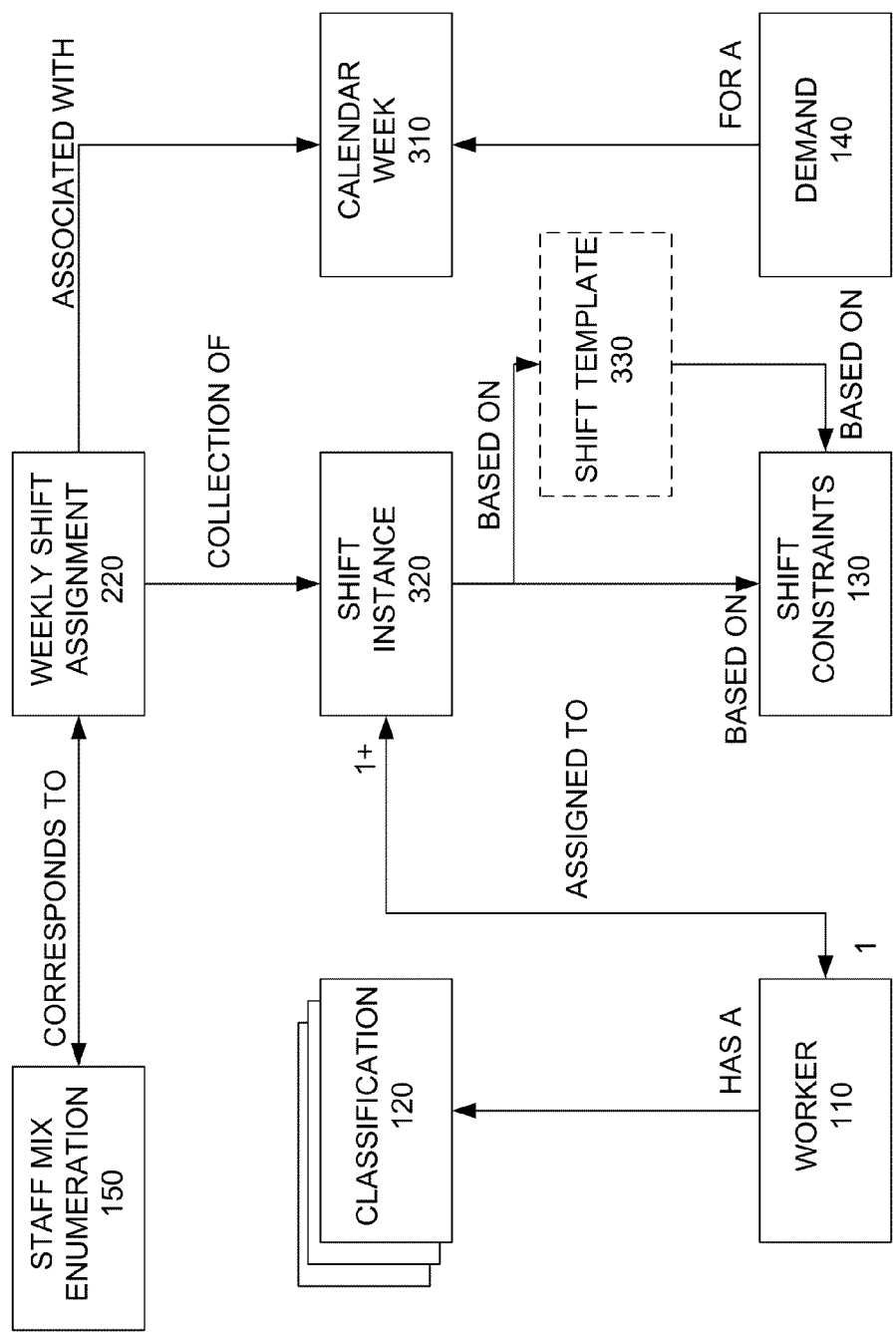
FIG. 3 is an object diagram describing some embodiments of the workforce scheduling logic of FIG. 1.

A person of ordinary skill in the art should recognize the objects illustrated in FIG. 3 as abstractions chosen to illustrate how one embodiment of logic for automatically scheduling a workforce 100 partitions functionality among components. Such a person should also recognize that other divisions of functionality are also possible, and these other possibilities are intended to be within the scope of this disclosure. Furthermore, although the objects in FIG. 3 are described in terms of specific data structures such as lists, flags, pointers, and collections, a person of ordinary skill in the art should appreciate that other data structures providing similar functionality can be used instead. As just one example, a particular implementation might use an array instead of a linked list. In general, the objects used by the systems and methods of automatically scheduling a workforce are described herein in terms of code and data, rather than with reference to a particular hardware device executing that code. Furthermore, although the system and methods are described in object-oriented terms, there is no requirement that the systems and methods be implemented in an object-oriented language. Rather, one of ordinary skill in the art will understand that the systems and methods can be implemented in any programming language, and executed on any hardware platform.

Figure 4:
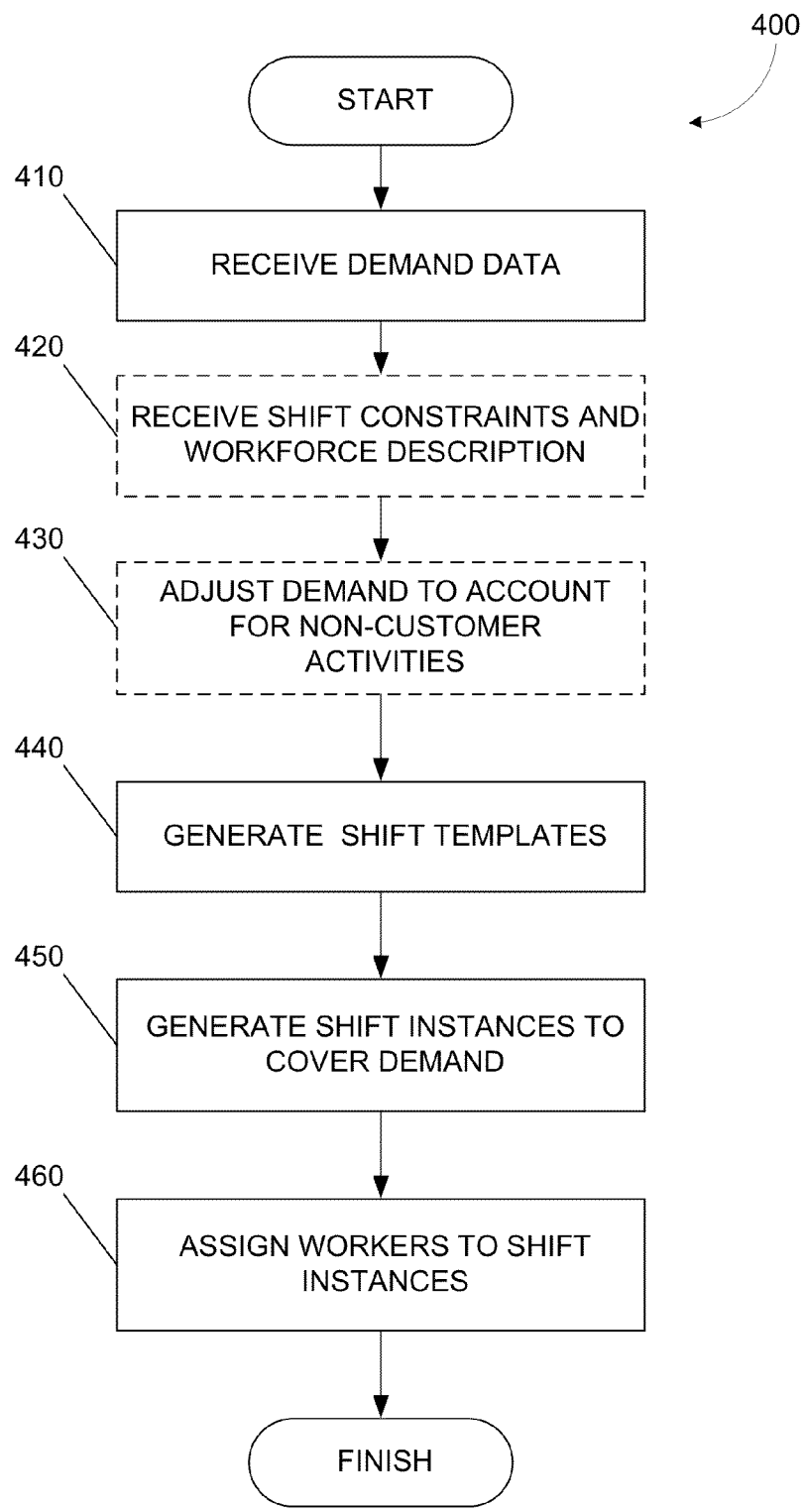
FIG. 4 is a flow chart of a process implemented by one embodiment of the workforce scheduling logic of FIG. 1.

FIG. 4 is a flow chart of a process implemented by one embodiment of logic for automatically scheduling a workforce 100. Process 400 begins at block 410, where data describing predicted demand (140) over a planning period is received. Next, at block 420, a description of shift constraints (130) and of the workers (110) is received. In some embodiments, since the description of shift constraints and the description of the workers are already known to, or internal to, logic for automatically scheduling a workforce 100, block 420 is optional. At block 430 (which is optional), demand 140 is adjusted to account for non-customer-facing activities. For example, where the staffing environment is a bank, non-customer-facing activities for a teller may include servicing the automatic teller machine or the night deposit box. Block 430 is also optional.

Processing continues at block 440, where shift templates 330 are generated from shift constraints 130. As described above in connection with FIG. 3, the collection of shift templates 330 represents all possible variations allowed by shift constraints 130. Next, at block 450, demand 140 for the planning period is examined, and a set of shift instances 320 are generated to match demand 140. In other words, block 450 "covers" the days that make up the planning period with the appropriate shift instances 320 as needed to meet demand. Processing continues at block 460, where workers are assigned to shift instances 320 in a manner which attempts to optimize individual worker utilization. Processing is complete after block 460.

The inventive techniques used in block 460 will be described in more detail below in connection with FIG. 6A and FIG. 6B. Notably, workers (or instances of worker classifications) are assigned to shift instances 320 at block 460 rather than block 450.

FIG. 5 is a data flow diagram of embodiments of shift template generation logic 510 and shift instance generation logic 520 which implement blocks 440 and 450 from FIG. 4, respectively. Shift template generation logic 510 receives as input shift constraints 130, and produces a set of shift templates 330. Shift templates 330 and demand 140 are used as input by shift instance generation logic 520 to produce a set of shift instances 320. Each individual shift instance 320 represents a particular date (530) that is "covered" with shifts. Together, the shift instances 320 produced by shift instance generation logic 520 represent the entire planning period (540) covered with shift instances.

Figure 6A:
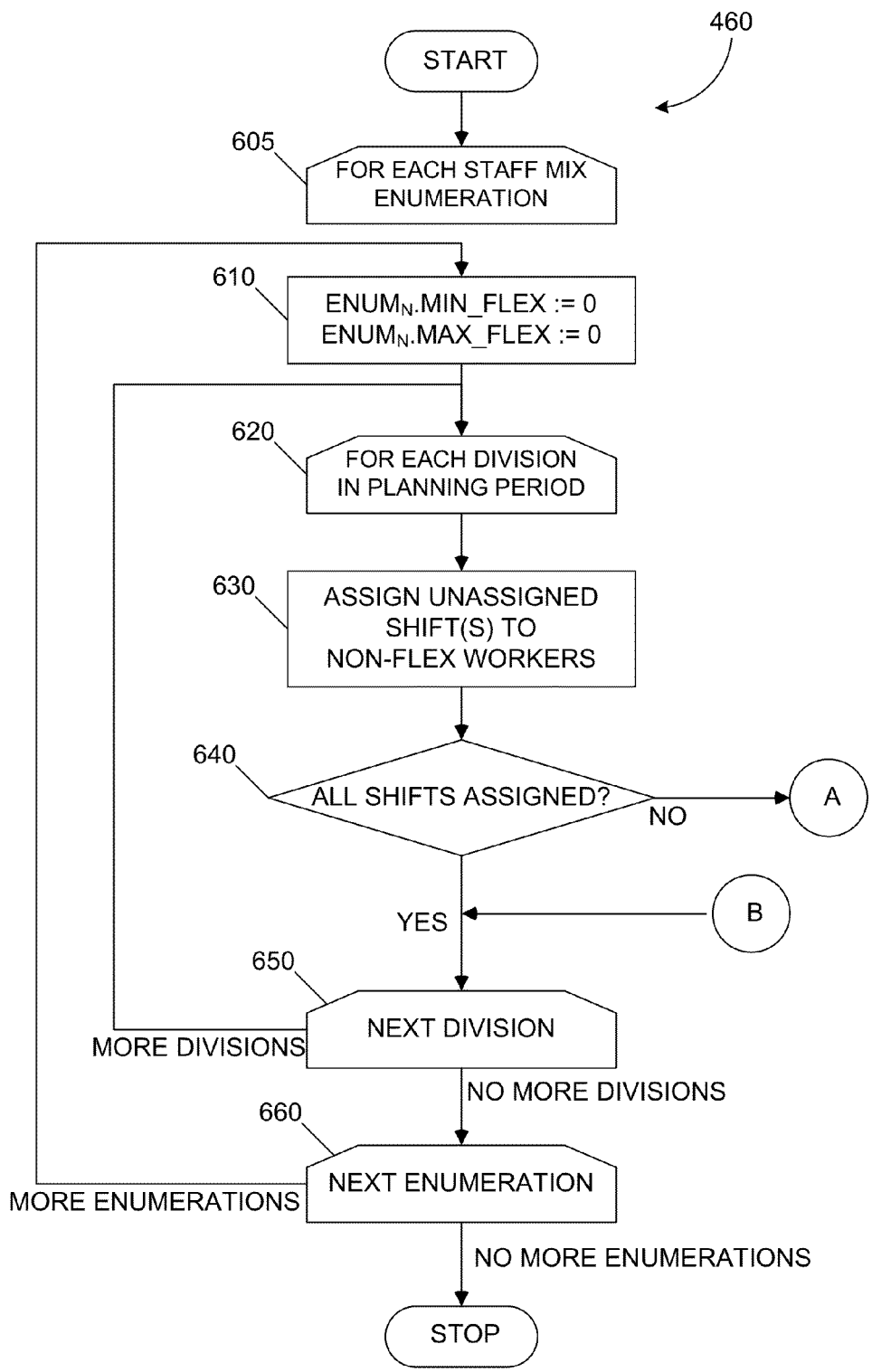
FIGS. 6A-6B form a flow chart of a process implemented by one embodiment of the shift assignment block of FIG. 4.
Figure 6B:
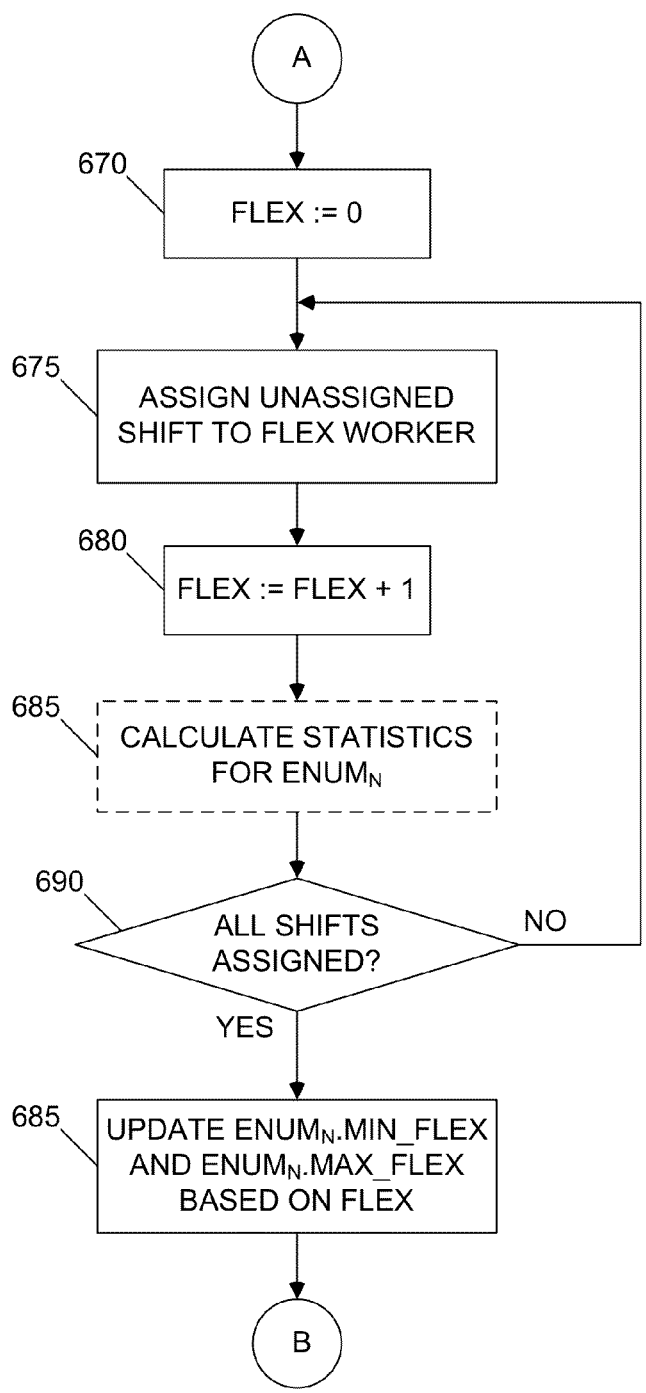

FIG. 6A is a flow chart of a process implemented by one embodiment of block 460, which assigns workers to shift instances. Process 460 begins (block 605) with an iteration loop over all the staff mix enumerations, which vary over the number of non-flexible workers (from 0 to a maximum N). Next, block 610 initializes counts of the minimum and maximum number of flexible workers for the current enumeration (Enum$_n$). Next, block 620 iterates through scheduling divisions in the planning period. In the example flowchart of FIGS. 6A-B, the scheduling division is a week, so the loop is iterated over each week. However, other embodiments may use a different scheduling division, for example, a bi-week, and the second-level iteration would then be per-bi-week.

Inside the outermost iteration (of scheduling divisions), unassigned shifts are assigned to non-flexible workers at block 630. At block 640, a test is performed to determine if all shift instances 320 (generated by shift instance generation logic 520) have been assigned. If all shift instances 320 have not been assigned, then operation continues with block 670 (FIG. 6B, discussed below). If all shift instances 320 have been assigned, operation moves to block 650, which iterates to the next division in the planning period, starting with block 630. If no more divisions are available (all have been processed), operation continues at block 660, which iterates to the next enumeration (starting at block 610). If all enumerations have been processed, process 460 is complete.

Block 670 is executed if unassigned shifts remain in the current division of the planning period, after assigning non-flexible workers. The sequence beginning with block 670 counts the number of flexible workers needed to fill unassigned shifts. Block 670 sets a local flexible workers counter to 0. Then unassigned shift instances 320 are assigned to flex workers at block 675, and the local flex counter is incremented by 1 at block 680. Block 685, which is optional, calculates various statistics related to the current staff mix enumeration Enum$_n$. (Examples of these statistics are listed in Table 1).

Finally, at block 690, a test is performed to determine if all shift instances 320 (generated by shift instance generation logic 520) have been assigned. If not, operation moves back to block 675 and blocks 675-690 are repeated. If all shift instances 320 have been assigned, Block 695 uses this local flex counter to update the minimum and maximum number of flexible workers for the current enumeration Enum$_n$ (e.g., if Flex<Enum$_n$·Min then Enum$_n$·Min=Flex and if Flex>Enum$_n$·Max then Enum$_n$·Max=Flex). Operation then returns to block 660 (FIG. 6A), described earlier.

TABLE 1

Examples of Staff Mix Enumeration Statistics

Full-time Head Count needed over the planning period
Part-time Head Count needed over the planning period
Average Flex-Time Head Count needed over the planning period
Minimum Flex-Time Head Count needed over the planning period
Maximum Flex-Time Head Count needed over the planning period
Full-Time expressed as FTE (Full-time Hours/FTE Basis)
Part-Time expressed as FTE (Part-Time Hours/FTE Basis)
Average Flex-time expressed as FTE (Average Flex-Time Hours/FTE Basis)
Full-Time Workers as % of Total Head Count
Part-Time Workers as % of Total Head Count
Average Flex-Time Workers as % of Head Count
Full-Time Workers as % of Assigned Hours
Part-Time Workers as % of Assigned Hours
Average Flex-Time Workers as % of Assigned Hours
Average Weekly Work Hours to cover in planning period; includes forecasted demand and non-customer-facing time
Average Weekly Total Hours Assigned during the planning period
% Over/Under Work Hours: (assigned hours − work hours)/(work hours).; increases when shrinkage increases
Intervals Overstaffed as % of Intervals: percentage of fine-grained demand intervals (e.g. 30 minutes) in the planning period in which the schedule is above the customer demand forecast by N+ workers.
Average Weekly Standard Hours based on the average head count times the maximum weekly hours of the worker classification.
Flexibility Index = (Hours available − Assigned hours)/Assigned hours); a relatively high number indicates that some of workers can potentially be scheduled for more than their assigned hours, to cover for another worker's PTO or unexpected absence.
Hours Unassigned- to Any Full-Time Worker
Cost of the enumeration: number of hours assigned to each worker classification multiplied by a cost attribute for the classification, summed across all classifications The process described in FIGS. 6A-B deals with only a single non-flexible classification. Other embodiments that include more than one non-flexible classification can be handled by modifying the portion of process 640 which assigns unassigned shifts to non-flexible workers (block 630), so that it first assigns workers of the highest priority non-flexible classification (e.g., full-time), then assigns workers of lower priority non-flexible classifications (e.g., part-time), before assigning flexible workers (blocks 675-695). With this modification, any number of non-flexible classifications can be supported.

Figure 7:
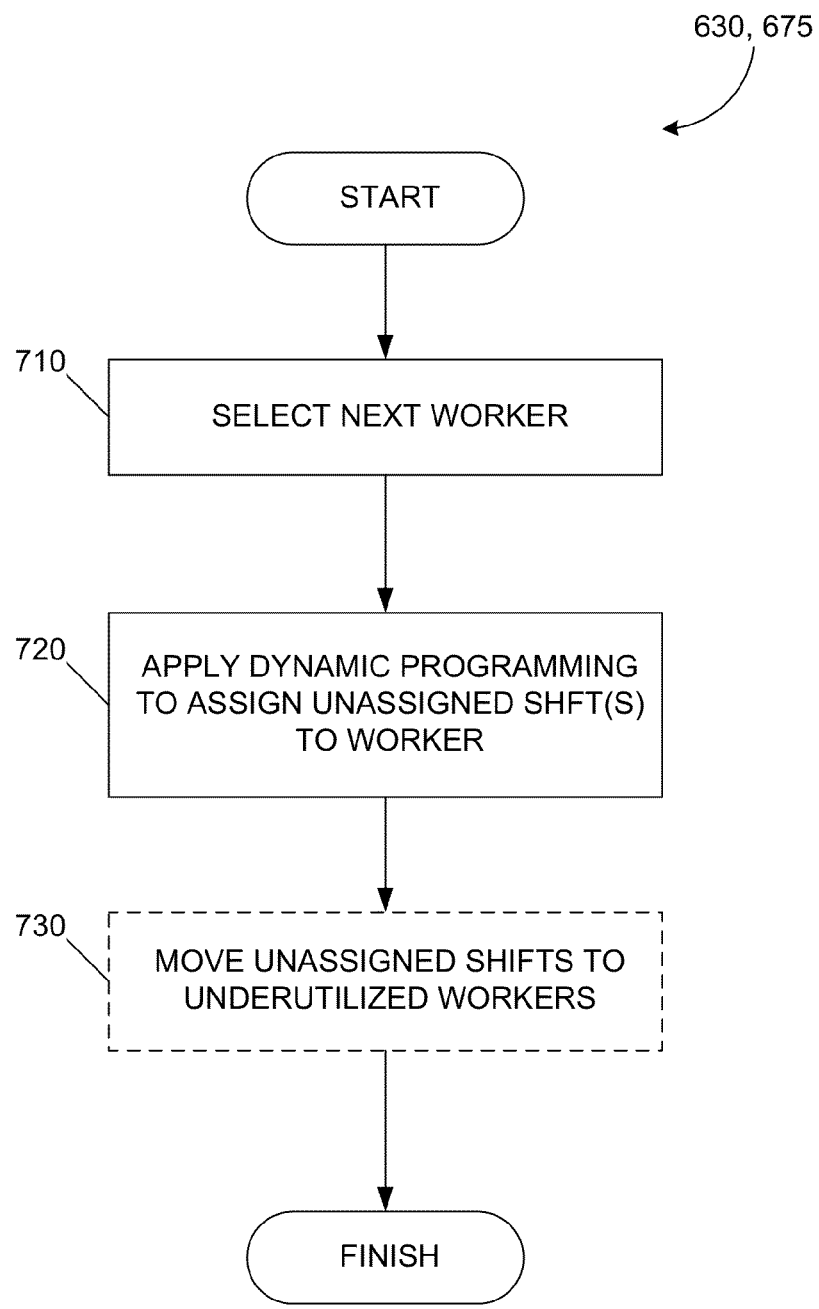
FIG. 7 is a flow chart of a process implemented by one embodiment of assign-unassigned-shifts block from the flowchart of FIGS. 6A-6B.

FIG. 7 is a flow chart of a process implemented by one embodiment of blocks 630 and 675, which assigns the next worker to one or more not-yet-assigned shift instances 320. The process begins at block 710, which selects the next worker to be assigned a shift instance (or instances). Block 710 prioritizes workers by classification 120: flex-time workers are always selected after any non-flexible classification employee; non-flexible classifications are selected according to associated priorities. For example, non-flexible full-time workers are selected before non-flexible part-time workers, and non-flexible part-time workers are selected before flex-time workers. A person of ordinary skill in the art should appreciate that a variety of techniques may be used to select the next worker, while adhering to the priorities implied by classifications 120.

Once the next worker 110 is selected at block 710, processing continues at block 720, where dynamic programming is used to assign one or more not-yet-assigned shift instances 320 to the selected worker 110, in a manner which minimizes under-staffing of each worker as an individual. Next, at block 730 shift assignments are adjusted by moving unassigned shifts to underutilized workers, and processing of the current worker 110 is then complete. Block 730 will be described in more detail below.

A person of ordinary skill in the art might perceive the specific problem solved by block 720—assigning shift instances 320 to get worker utilization as close to the worker's capacity as possible, without going over capacity—as a classic knapsack problem. However, an inventive aspect of logic for automatically scheduling a workforce 100 is the decomposition of the overall problem into two sub-problems—generating shift instances (block 450 of FIG. 4) and then assigning workers to shift instances (block 460 of FIG. 4). Only after the overall problem is decomposed in this manner would a person of ordinary skill in the art recognize the second sub-problem as a knapsack problem.

The shift adjustment performed at block 730 is optional, but may be advantageous in some scenarios. The dynamic programming performed in block 720 is an optimizing algorithm for a single knapsack problem. However, block 720 considers each worker separately and independently. Logic for automatically scheduling a workforce 100 assigns shifts to multiple workers. Therefore, optimizing utilization of individual workers may not result in global optimization. More specifically, since a worker is limited to working a single shift in a day, some shifts may remain unassigned on particular days, even though particular workers still have capacity (i.e., haven't yet reached maximum hours for the week). Such workers are underutilized, so overall utilization can be improved by moving unassigned shifts to these underutilized workers.

The embodiment shown in FIG. 7 performs shift adjustment (block 730) after each worker is assigned one or more shift instances 320 in a given week. However, other embodiments perform shift adjustment (block 730) only when the number of not-yet-assigned shift instances is relatively low, either as an absolute number, or relative to the total number of shift instances.

Although a person of ordinary skill in the art should be familiar with dynamic programming as used by logic 720 to solve the knapsack problem, a brief discussion and example follow. The problem notation used will be:

d—number of operating days in a week; if bank is open 5 days a week then d=5 i—suffix representing day of the week that is being considered for shift assignment (i=1, 2, ..., d)

c—capacity of worker being assigned shift instances (c=40 if worker can work 40 hours/week).

j—suffix representing hours of worker capacity being considered (j=1, 2, ..., c)

$s_{ix}$ length of shift x in day i (x=1, 2, ..., $n_i$). Only one shift instance of distinct length needs to be considered, since the worker can be assigned at most one shift for a day. For example, if the shifts generated for a given day i are two shifts of 4 hours, 3 shifts of 6 hours and, 3 shifts of 8 hours, then $n_i$=3 with $s_{i1}$=4, $s_{i2}$=6 and, $s_{i3}$=8. If the worker is assigned one 6-hour shift, then the available capacity of the worker is reduced by 6 hours regardless of which of the three 6-hour shifts was assigned to the worker.

The dynamic programming recursion is defined as follows:

$$f(i, j) = \max \begin{cases} f(i-1, j) \\ f(i-1, j-s_{i1}) + s_{i1} \\ f(i-1, j-s_{i2}) + s_{i2} \\ \vdots \\ f(i-1, j-s_{in_i}) + s_{in_i} \end{cases}$$

or i = 1, 2, ..., d; j = 1, 2, ..., c

Boundary conditions are f(0, j)=0 for j=0 and f(0, j)=−∞ for j≠0, with optimal solution $$f^* = \max_{\text{all } j}(f(d, j))$$

The following example is used to illustrate the implementation of the shift instance assignment procedure performed by dynamic programming logic 720. In this example, a store is open from 10 am to 5 pm Monday through Friday, and is closed Saturday and Sunday. Thus, the scheduling period is Monday-Friday. Table 2 shows the shift instances generated by shift instance generation logic 520 generated to cover the demand profile for the week. This example assumes, without loss of generality, that there are no breaks in the shift instances. The workforce includes one full-time worker (defined in this example as working a maximum of 26 hours in a week) and one part-time worker (defined in this example as working a maximum of 20 hours a week). Two flexible-time workers take up the residual workload. The problem solved by dynamic programming logic 720 is to assign the shifts to the workers in the most efficient manner (i.e. to maximum utilization of workers).

TABLE 2

Results of shift generation algorithm

| Day 1 (Mon) | Day 2 (Tues) | Day 3 (Wed) | Day 4 (Thurs) | Day 5 (Fri) |
|---|---|---|---|---|
| 5 shifts: | 5 shifts: | 4 shifts: | 4 shifts: | 5 shifts: |
| 10 am to 4 pm; | 10 am to 4 pm; | 10 am to 4 pm; | 10 am to 4 pm; | 10 am to 4 pm; |
| 10 am to 4 pm; | 11 am to 5 pm; | 11 am to 5 pm; | 11 am to 5 pm; | 10 am to 4 pm; |
| 11 am to 5 pm; | 11 am to 5 pm; | 10 am to 2 pm; | 1 pm to 5 pm; | 11 am to 5 pm; |
| 11 am to 1 pm; | 11 am to 1 pm; | 3 pm to 5 pm | 11 am to 1 pm | 11 am to 5 pm; |
| 3 pm to 5 pm | 3 pm to 5 pm | | | 11 am to 1 pm |

Dynamic programming logic 720 solves this problem as follows. Dynamic programming logic 720 first assigns the shift instances to the full-time worker. Note that during shift instance assignment, only the duration of shift instances are relevant, so for the full-time worker the choice of shift instance on any given day can be summarized as in Table 3.

TABLE 3

Choice of shifts for the full-time worker

| Day 1 (Mon) Shifts | Day 2 (Tues) Shifts | Day 3 (Wed) Shifts | Day 4 (Thurs) Shifts | Day 5 (Fri) Shifts |
|---|---|---|---|---|
| 2 shifts: 6-Hour shift; 2-Hour shift | 2 shifts: 6-Hour shift; 2-Hour shift | 3 shifts: 6-Hour shift; 4-Hour shift; 2-Hour shift | 3 shifts: 6-Hour shift; 4-Hour shift; 2-Hour shift | 2 shifts: 6-Hour shift; 2-Hour shift |

For simplification, it is assumed here that i=1, 2, 3, 4, and 5 represent Monday, Tuesday, Wednesday, Thursday and Friday, respectively. However, this is not a requirement for dynamic programming logic 720: the logic can first consider Wednesday for shift instance assignment, then Friday, and so on. In some scenarios, randomizing the order in which the days are selected for shift instance assignment is more efficient: if the number of recommended full-time/part-time/flex-time workers is under-estimated, then there will be some unassigned shifts and randomization ensures that the unassigned shift instances are spread evenly over all days of the week instead of being concentrated on the last days of the week.

Problem parameters can be initialized as shown in Table 4 (with d=5; c=26)

TABLE 4

Problem Parameters with d = 5; c = 26

| Day 1 (Mon) | Day 2 (Tues) | Day 3 (Wed) | Day 4 (Thurs) | Day 5 (Fri) |
|---|---|---|---|---|
| $n_1 = 2$; | $n_2 = 2$; | $n_3 = 3$; | $n_4 = 3$; | $n_5 = 2$; |
| $s_{11} = 6$; | $s_{21} = 6$; | $s_{31} = 6$; | $s_{41} = 6$; | $s_{51} = 6$; |
| $s_{12} = 2$ | $s_{22} = 2$ | $s_{32} = 4$; | $s_{42} = 4$; | $s_{52} = 2$ |
|  |  | $s_{33} = 2$ | $s_{43} = 2$ |  |

Let i=1 (day 1—Monday). This obtains $$f(1, 0) = \max\begin{cases} f(1-1, 0) = f(0, 0) = 0 \\ f(1-1, 0-s_{11}) + s_{i1} = f(0, -6) + 6 = -\infty \\ f(1-1, 0-s_{12}) + s_{i2} = f(0, -2) + 2 = -\infty \end{cases} = 0$$

$$f(1, 1) = \max\begin{cases} f(1-1, 1) = f(0, 1) = -\infty \\ f(1-1, 1-s_{11}) + s_{i2} = f(0, -5) + 6 = -\infty \\ f(1-1, 1-s_{12}) + s_{i2} = f(0, -1) + 2 = -\infty \end{cases} = -\infty$$

$$f(1, 2) = \max\begin{cases} f(1-1, 2) = f(0, 2) = -\infty \\ f(i-1, j-s_{i1}) + s_{1i1} = f(0, -4) + 6 = -\infty \\ f(i-1, j-s_{i2}) + s_{i2} = f(0, 0) + 2 = 0 + 2 = 2 \end{cases} = 2$$

Continuing in similar order, the day 1 calculations can be summarized as:

$f(1,j)=j$ for $j=0,2,6$; and $f(1,j)=-\infty$ for $j\neq 0,2,6$

The above results can be interpreted as follows. After considering shifts on day 1 (Monday), it is possible to assign exactly 0, 2 or 6 hours of workload to the full-time worker. All other workloads are infeasible, since $f(1, j)=-\infty$ for $j\neq 0$, 2, or 6.

Proceeding to day 2 (Tuesday) calculations, i=2 and:

$$f(2, 0) = \max\begin{cases} f(2-1, 0) = f(1, 0) = 0 \\ f(2-1, 0-s_{21}) + s_{21} = f(1, -6) + 6 = -\infty \\ f(2-1, 0-s_{22}) + s_{22} = f(1, -2) + 2 = -\infty \end{cases} = 0$$

$$f(2, 1) = \max\begin{cases} f(2-1, 1) = f(1, 1) = -\infty \\ f(2-1, 1-s_{21}) + s_{21} = f(1, -5) + 6 = -\infty \\ f(2-1, 1-s_{22}) + s_{22} = f(1, -1) + 2 = -\infty \end{cases} = -\infty$$

$$f(2, 2) = \max\begin{cases} f(2-1, 2) = f(1, 2) = -\infty \\ f(2-1, 2-s_{21}) + s_{21} = f(1, -4) + 6 = -\infty \\ f(2-1, 2-s_{22}) + s_{22} = f(1, 0) + 2 = 0 + 2 = 2 \end{cases} = 2$$

$$f(2, 3) = \max\begin{cases} f(2-1, 3) = f(1, 2) = -\infty \\ f(2-1, 3-s_{21}) + s_{21} = f(1, -3) + 6 = -\infty \\ f(2-1, 3-s_{22}) + s_{22} = f(1, 1) + 2 = -\infty \end{cases} = -\infty$$

$$f(2, 4) = \max\begin{cases} f(2-1, 4) = f(1, 4) = -\infty \\ f(2-1, 4-s_{21}) + s_{21} = f(1, -2) + 6 = -\infty \\ f(2-1, 4-s_{22}) + s_{22} = f(1, 2) + 2 = 2 + 2 = 4 \end{cases} = 4$$

Proceeding in similar manner, calculations for day 2 can be summarized as:

$f(2,j)=j$ for $j=0,2,4,6,8,12$; and $f(2,j)=-\infty$ for $j\neq 0,2,4,6,8,12$.

The interpretation of above expressions is as follows. After considering the shift instances on day 1 and day 2 (Monday and Tuesday), it is possible to assign exactly 0, 2, 4, 6, 8 and 12 hours of work load to the full-time worker. All other workloads are infeasible.

Consider f(2, 4)=4. To determine which shifts were assigned on Monday and Tuesday to the worker that resulted in the total work load being equal to 4 hours, dynamic programming logic 720 backtracks through the f(i, j) calculations, and finds that f(2, 4)=f(1, 2)+$s_{22}$=2+2=4. Thus, a shift instance of length $s_{22}$=2 hours was assigned on Tuesday and on Monday the workload was f(1, 2)=2 hours. The workload of 2 hours on Monday was achieved by assigning a shift instance of length $s_{12}$=2 hours (This is identified by backtracking the calculation of f(1, 2)).

The values of f(i, j) are thus determined for all i=(1, 2, 3, 4, 5) and j=(0, 1, 2, ..., c). To find the optimal shift instance assignment for the full-time worker, dynamic programming logic 720 identifies the maximum f(5, j) for j=1, 2, ..., c. The maximum value is f(5, 26)=26. There are two shift instance assignments ($s_{11}$, $s_{21}$, $s_{31}$, $s_{41}$, $s_{53}$; $s_{11}$, $s_{21}$, $s_{32}$, $s_{42}$, $s_{51}$) that result in f(5, 26)=26. Dynamic programming logic 720 identifies shift instance assignments through backtracking.

Dynamic programming logic 720 removes those shift instances assigned to the full-time worker from the set of shift instances, and then repeats this procedure for the part-time workers, to maximize worker utilization.

Figure 8:
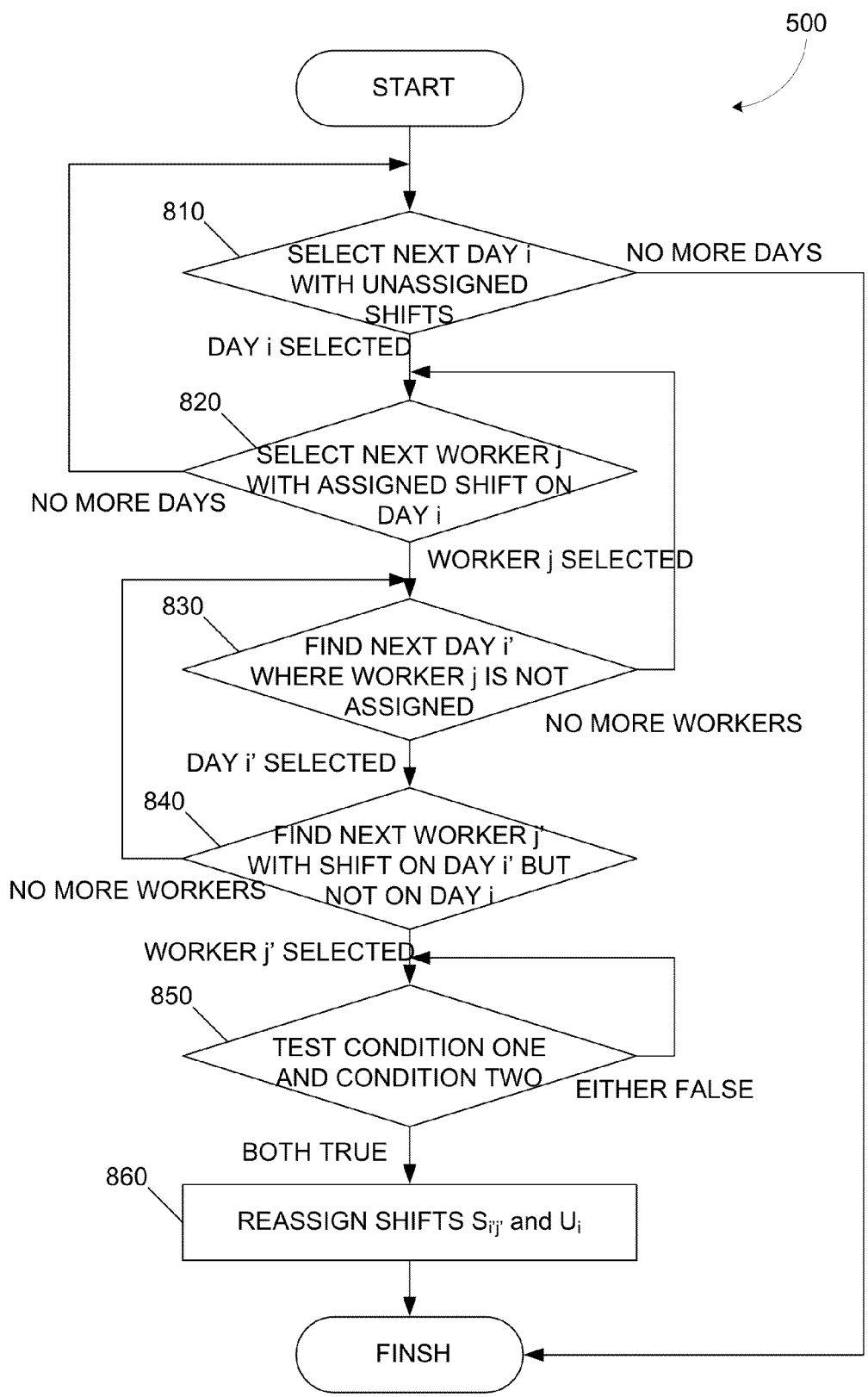
FIG. 8 is a flow chart of a process implemented by one embodiment of the shift adjustment block from FIG. 7.

FIG. 8 is a flow chart of a process implemented by one embodiment of block 730 from FIG. 7, which adjusts the assignment of workers to shift instances for a particular scheduling interval. Process 730 begins at block 810, which selects the next day i that has unassigned shift instances. If there are no such days, or all days have been considered, then process 730 is finished. Once the next day i has been selected, processing continues at block 820, which selects the next worker j with an assigned shift instance on day i. If there are no such workers, or all workers have been considered, then the process returns to block 810 to select the next day i. Otherwise, the next worker j has been selected, and processing continues at block 830.

Block 830 selects the next day i' (in the week under consideration) on which worker j is not assigned a shift. If there are no such days, or all days have been considered, then the process returns to block 820 to select the next worker j. Otherwise, the next day i' has been selected, and processing continues at block 840. Block 840 selects the next worker j' with an assigned shift instance on day i'but no assigned shift instance on day i. If there are no such workers, or all workers have been considered, then the process returns to block 830 to select the next day i'. Otherwise, i, j, i', and j' have been selected, and processing continues at block 850.

Block 850 makes two comparisons: $w_j+s_{i'j'}<m_j$; and $(w_{j'}-s_{i'j'}+u_i)<m_{j'}$; where $u_i$ is length of unassigned shift instance on day i, $s_{i'j'}$ is length of shift instance assigned to worker j on day i, $w_j$ is total hours assigned to worker j during the scheduling interval, and $m_j$ is maximum hour capacity during the scheduling interval for employee j. If either comparison in block 850 is False, then processing returns to block 840 to select the next worker j'. However, if both comparisons are True, then block 860 adjust shift assignments by removing shift instance $s_{i'j'}$ from the assignment for worker j' (i.e., unassigns shift $s_{i'j'}$ from worker j'), assigning shift instance $s_{i'j'}$ to worker j, and assigning shift instance $u_i$ to worker j'. Once the assignments have been readjusted, process 730 is finished.

Figure 9:
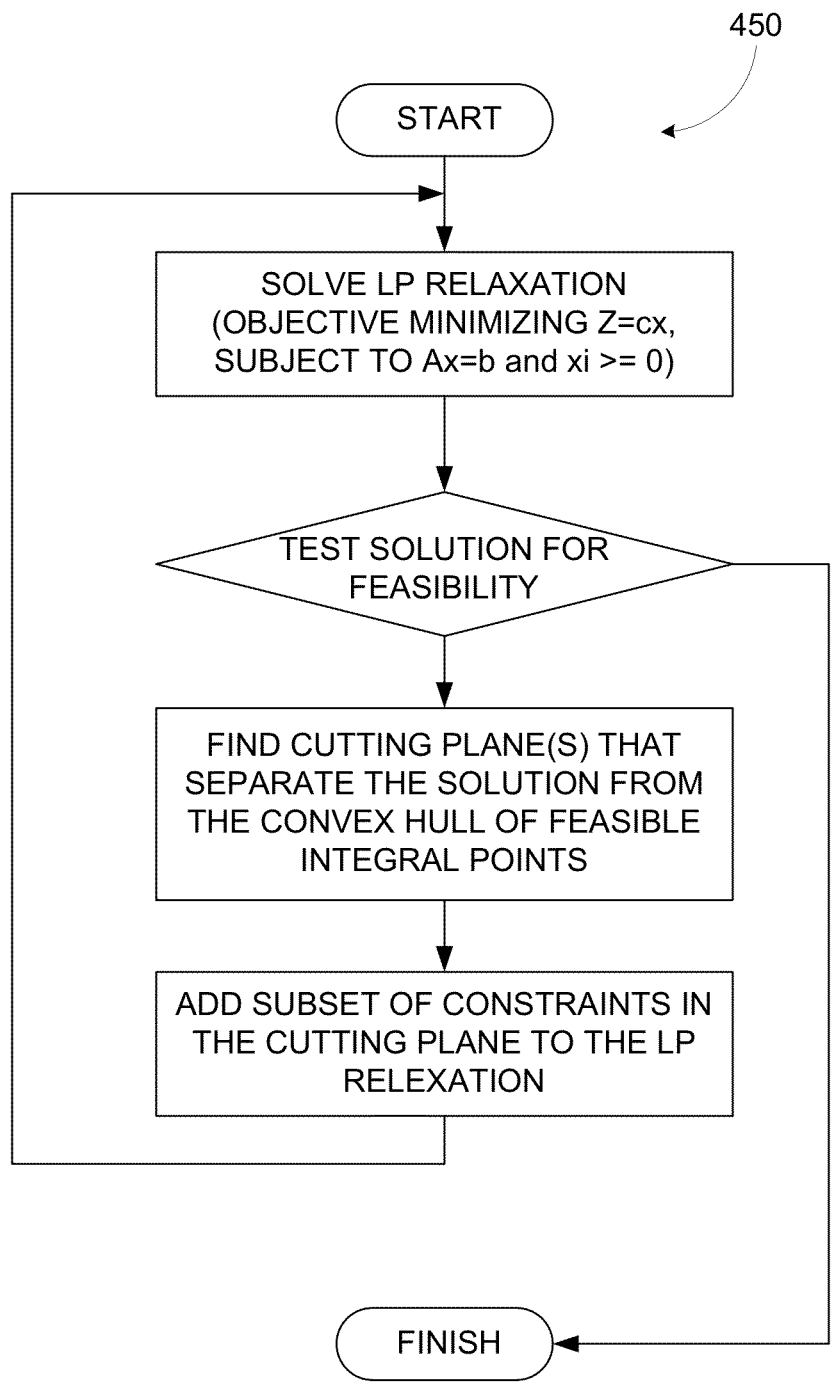
FIG. 9 is a flowchart of one embodiment of the shift template generation block of FIG. 4.

FIG. 9 is a flowchart of one embodiment of block 450 which uses a cutting plane algorithm. The process starts at block 910, where a linear programming relaxation is solved, with the objective of minimizing Z=cx, subject to $A_x$=b and $x_i$>=0. Next, at block 920, the solution is tested for feasibility. If the solution is feasible, the process is finished. Otherwise, block 930 finds one or more cutting planes that separate the optimal solution to the relaxation from the convex hull of feasible integral points. Next, at block 940, a subset of these constraints is added to the relaxation, and the process repeats starting at block 910.

Although a person of ordinary skill in the art should be familiar with LP relaxation, cutting planes and the branch-and-bound algorithm, a brief discussion of these concepts follows. The problem notation used for the LP relaxation discussion are as follows:

Objective Function:
Minimize Z=cx
Subject to Ax=b, xi≥0
where
c=n-dimensioned row vector whole elements c, represent the shift length in hours for shift of template i (i=1, 2, ..., n);
x=n-dimensioned column vector whole elements xi represent the number of shifts used of template I;
A=matrix of order m×n made up of n column vectors each of size m (m is the number of time intervals in the day for which shifts are being generated); the n column vectors represent the shift templates; each element $a_{ij}$ of the matrix is either 1 or 0 (1 representing that shift of template j (j=1, 2, ..., n) covers time interval i (i=1, 2, ..., m).

A Gomory cut is added as a new constraint to the LP through the following steps:
Find the first non-integer basic variable row v in the simplex tableau;
Adjoin to the tableau the following Gomory cut generated from the source row v:

$$s + \sum_{j \in J} [a_{vj}] \cdot x_j = [a_{v0}];$$

whereas is the new basic variable corresponding to the new constraint;

xi (j∈J) represents the basic variable from the set of basic variables J; and

[y] represents the fractional portion of the real variable y.

The branch and bound algorithm is an LP-based technique that efficiently conducts a semi-complete enumeration search of the solution space. It solves LP-relaxations and progressively adds constraints to the problems based on the solutions obtained. The branching technique used in the branch and bound implementation for the shift generation problem is as follows:

Find the first non-integer row v in the simplex tableau; let $x_j$ be the basic variable corresponding to this row with its value equal to $b_v$;
Generate two nodes of LP problems:
Add the constraint $x_j \leq \lfloor b_v \rfloor$, where refers to the largest integer smaller than $b_v$, to the current constraint set.
Add the constraint $x_j \geq \lceil b_v \rceil$ where refers to the smallest integer larger than $b_v$, to the current constraint set.

Figure 10:
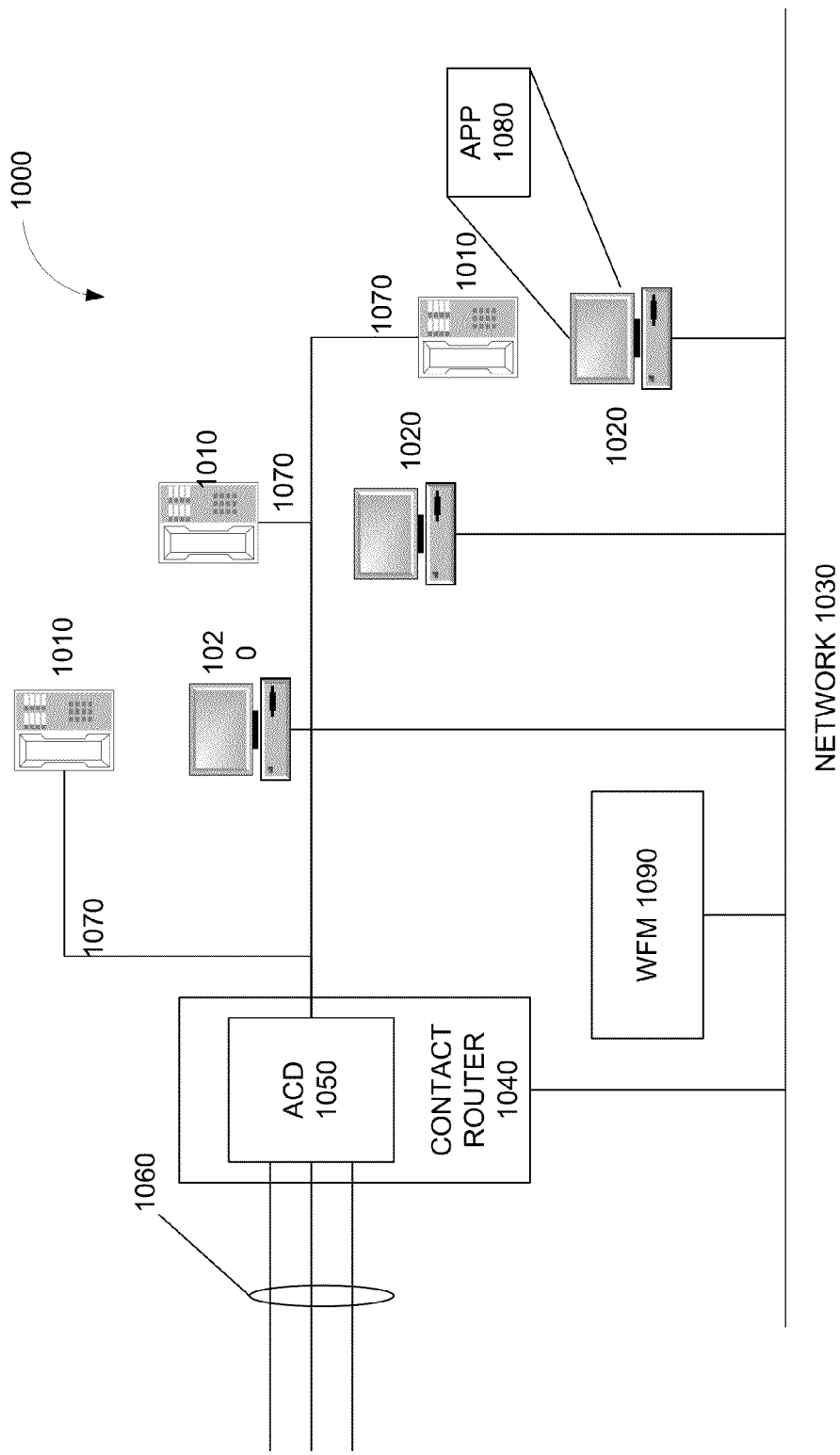
FIG. 10 is a block diagram of an exemplary customer center environment.

FIG. 10 is a block diagram of one exemplary environment in which logic for automatically scheduling a workforce 100 can be used, namely customer center environment 1000. Customer center 1000 is staffed by agents who handle incoming and/or outgoing contacts. Although the traditional and most common form of contact is by phone, other types of contacts can be used, such as text chat, web collaboration, email, and fax. An agent workspace includes an agent phone 1010 and a workstation computer 1020. A network 1030 connects one or more of the workstations 1020.

A contact router 1040 distributes or routes contacts (incoming or outgoing) to an agent position. Voice over Internet Protocol (VoIP) calls and computer-based contacts (e.g., chat, email) are routed over one or more data networks, and distributed over network 1030 to one of the agent workstations 1020. Contact router 1040 may include an automatic call distributor (ACD) 1050 to route phone contacts. The embodiments described herein will refer to ACD 1050 instead of contact router 1040, but analogous contact router actions and operations are intended to be captured by this disclosure. Note that a predictive dialer (not shown) may be used for directing outbound calls to agents for handling.

If an agent is not available to handle a particular call, ACD 1050 puts the call into a queue, which effectively places the caller on hold. When an agent is available, contact router 1040 connects the outside trunk line 1060 carrying the phone call to one of the agents. More specifically, contact router 1040 connects an outside trunk line to the trunk line 1070 of the selected agent.

When an agent is ready to handle contacts, the agent first logs into contact router 1040. This login notifies contact router 1040 that the agent is available to take calls. An agent's contact router state changes throughout the workday, as the agent performs work activities such as handling calls, performing after-call work, and taking breaks. An example list of states includes available, busy, after-call work, and unavailable.

While handling a contact, the agent interacts with one or more applications 1080 running on workstation 1020. By way of example, workstation applications can provide the agent with access to contact records, product information, ordering status, and transaction history. The applications may access one or more business databases (not shown) via network 1030.

Customer center 1000 also includes a workforce management system (WFMS) 1090. WFMS 1090 performs many functions. One such function is providing a customer center supervisor or manager with information about agents and contacts, both historical and real-time. Another function is supplying the supervisor with information on how well each agent complies with customer center policies. Yet another function is calculating staffing levels and creating agent schedules based on historical patterns of incoming contacts. The functionality of the entire WFMS 1090 is typically divided among several applications, some of which have a user interface component, and WFMS 1090 comprises the suite of applications.

A customer center may include, but is not limited to, outsourced customer centers, outsourced customer relationship management, customer relationship management, voice of the customer, customer interaction, customer center, multimedia customer center, remote office, distributed enterprise, work-at-home agents, remote agents, branch office, back office, performance optimization, workforce optimization, hosted customer centers, and speech analytics, for example.

In one embodiment, the integrated system of customer center 1000 also includes one or more of a performance manager, an evaluation manager, and a development manager. The evaluation manager allows various types of employee performance review processes to be managed (i.e., 360 degree reviews). The performance manager receives data from the evaluation manager and presents the performance data to the contact center manager through various scorecard views. The development manager tracks employee Learning/Development and detects a need for training.

It should be noted that embodiments of one or more of the systems described herein may be used to perform an aspect of speech analytics (i.e., the analysis of recorded speech or real-time speech), which can be used to perform a variety of functions, such as automated call evaluation, call scoring, quality monitoring, quality assessment and compliance/adherence. By way of example, speech analytics can be used to compare a recorded interaction to a script (e.g., a script that the agent was to use during the interaction). In other words, speech analytics can be used to measure how well agents adhere to scripts, identify which agents are "good" sales people and which ones need additional training. As such, speech analytics can be used to find agents who do not adhere to scripts. Yet in another example, speech analytics can measure script effectiveness, identify which scripts are effective and which are not, and find, for example, the section of a script that displeases or upsets customers (e.g., based on emotion detection). As another example, compliance with various policies can be determined. Such may be in the case of, for example, the collections industry where it is a highly regulated business and agents must abide by many rules. The speech analytics of the present disclosure may identify when agents are not adhering to their scripts and guidelines. This can potentially improve collection effectiveness and reduce corporate liability and risk.

In this regard, various types of recording components can be used to facilitate speech analytics. Specifically, such recording components can perform one or more of various functions such as receiving, capturing, intercepting, and tapping of data. This can involve the use of active and/or passive recording techniques, as well as the recording of voice and/or screen data.

It should be noted that speech analytics can be used in conjunction with such screen data (e.g., screen data captured from an agent's workstation/PC) for evaluation, scoring, analysis, adherence, and compliance purposes, for example. Such integrated functionality can improve the effectiveness and efficiency of, for example, quality assurance programs. For example, the integrated function can help companies to locate appropriate calls (and related screen interactions) for quality monitoring and evaluation. This type of "precision" monitoring improves the effectiveness and productivity of quality assurance programs.

Another aspect that can be accomplished involves fraud detection. In this regard, various manners can be used to determine the identity of a particular speaker. In some embodiments, speech analytics can be used independently and/or in combination with other techniques for performing fraud detection. Specifically, some embodiments can involve identification of a speaker (e.g., a customer) and correlating this identification with other information to determine whether a fraudulent claim for example is being made. If such potential fraud is identified, some embodiments can provide an alert. For example, the speech analytics of the present disclosure may identify the emotions of callers. The identified emotions can be used in conjunction with identifying specific concepts to help companies spot either agents or callers/customers who are involved in fraudulent activities.

Referring back to the collections example outlined above, by using emotion and concept detection, companies can identify which customers are attempting to mislead collectors into believing that they are going to pay. The earlier the company is aware of a problem account, the more recourse options they may have. Thus, the speech analytics of the present disclosure can function as an early warning system to reduce losses.

Also included in this disclosure are embodiments of integrated workforce optimization platforms, as discussed in U.S. patent application Ser. No. 11/359,356, filed on Feb. 22, 2006, entitled "Systems and Methods for Workforce Optimization," and U.S. patent application Ser. No. 11/540,185, filed on Sep. 29, 2006, entitled "Systems and Methods for facilitating Contact Center Coaching," both of which are hereby incorporated by reference in their entireties. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (Kips) and scorecards that analyze and help identify synergies, opportunities and improvement areas; (4) e-Learning—training, new information and protocol disseminated to staff, leveraging best practice customer interactions and delivering learning to support development; (5) Analytics—deliver insights from customer interactions to drive business performance; and/or (6) Coaching—feedback to promote efficient performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

Figure 11:
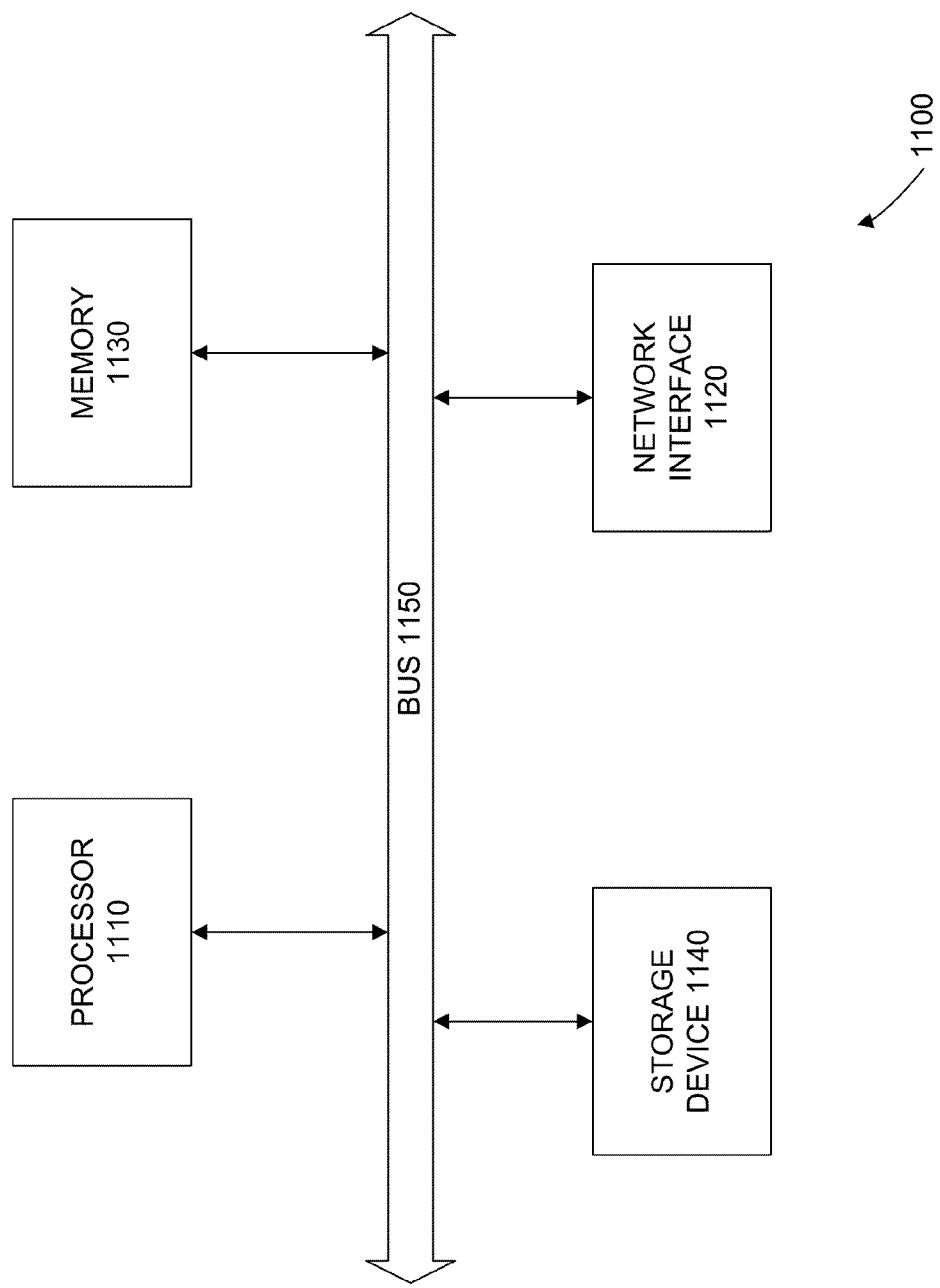
FIG. 11 is a hardware block diagram of a general-purpose computer that can be used implement the workforce scheduling logic of FIG. 1.

FIG. 11 is a hardware block diagram of a general-purpose computer 1100 that can be used to implement logic for automatically scheduling a workforce 100. The computer 1100 contains a number of components that are well known in the art of call center software, including a processor 1110, a network interface 1120, memory 1130, and non-volatile storage 1140. Examples of non-volatile storage include, for example, a hard disk, flash RAM, flash ROM, EEPROM, etc. These components are coupled via a bus 1150. The memory 1130 contains instructions which, when executed by the processor 1110, implement the methods and systems disclosed herein. Omitted from FIG. 11 are a number of conventional components, known to those skilled in the art that are unnecessary to explain the operation of the computer 1100.

The systems and methods disclosed herein can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In other embodiments, the system and/or method is implemented in hardware, including, but not limited to, a programmable logic device (PLD), programmable gate array (PGA), field programmable gate array (FPGA) or an application-specific integrated circuit (ASIC).

In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

Note that the computer-readable medium could even be paper or another suitable medium on which the program is printed. Using such a medium, the program can be electronically captured (using, for instance, optical scanning of the paper or other medium), compiled, interpreted or otherwise processed in a suitable manner, and then stored in a computer memory. In addition, the scope of the certain embodiments of the present invention includes embodying the functionality of the preferred embodiments of the present invention in logic embodied in hardware or software-configured mediums.

It should be noted that any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

At least the following is claimed:

1. A method of scheduling a set of workers, each worker associated with one of a set of flexibility classifications, the set including a flex-time classification, comprising:
in a processor:
generating a set of shift instances to cover forecasted demand over a planning, period;
producing a set of staff mix enumerations to cover the shift instances, the set of enumerations varying from a first enumeration including zero workers of at least one non-flex-time classification and a first computed number of workers of the flex-time classification, to a last enumeration including a maximum number of workers of the at least one non-flex-time classification and a last computed number of workers of the flex-time classification; and
assigning the shift instances to the set of workers by iterating through the each of the workers to assign at least a portion of the shift instances to a selected one of the workers, such that total hours assigned to the selected worker depends on a per-interval maximum number and a per-interval minimum number of hours associated with the classification of the selected worker.

2. The method of claim 1, wherein workers having a classification other than flex-time are assigned shill instances before workers having a classification of flex-time .

3. The method of claim 1, wherein the total hours assigned to the selected worker approach, but do not exceed, the per-interval maximum associated with the classification of the selected worker.

4. The method of claim 1, wherein assigning the shift instances to the set of workers uses dynamic programming.

5. The method of claim 1, further comprising adjusting shift assignments, wherein adjusting shift assignments comprises:
determining the presence of an unassigned shift instance on a given day;
determining the presence of an underutilized, worker as compared to the per-interval maximum associated with the classification of the corresponding worker; and
assigning the unassigned shift instance to the underutilized worker.

6. The method of claim 5, wherein adjusting shift assignments further comprises:
determining the presence of a shift instance assigned to the underutilized worker on the given day; and
swapping the shift instance assigned to the underutilized worker on the given day with another shift instance assigned to another worker on a different day.

7. The method of claim 1, further comprising conditionally adjusting shift assignments based on a number of unassigned shifts, wherein conditionally adjusting shift assignments comprises:
determining the presence of an unassigned shift instance on a given day;
determining the presence of an underutilized worker as compared to the per-interval maximum associated with the classification of the corresponding worker; and assigning the unassigned shift instance to the underutilized worker.

8. A non-transitory computer readable medium having instructions stored thereon for operating a computer system to schedule a set of workers, each worker associated with one of a set of flexibility classifications, the set including a flex-time classification, wherein the instructions, when executed by the computer system, direct the computer system to:
   generate a set of shift instances to cover forecasted demand over a planning period;
   produce a set of staff mix enumerations to cover the shift instances, the set of enumerations varying from a first enumeration including zero workers of at least one non-flex-time classification and a first computed number of workers of the flex-time classification, to a last enumeration including a maximum number of workers of the at least one non-flex-time classification and a last computed number of workers of the flex-time classification; and
   assign the shift instances to the set of workers by iterating through the each of the workers to assign at least a portion of the shift instances to a selected one of the workers, such that total hours assigned to the selected worker depends on a per-interval maximum number and a per-interval minimum number of hours associated with the classification of the selected worker.

9. The non-transitory computer readable medium of claim 8, wherein workers having a classification other than flex-time are assigned shift instances before workers having a classification of flex-time.

10. The non-transitory computer readable medium of claim 8, wherein the total hours assigned to the selected worker approach, but do not exceed, the per-interval maximum associated with the classification of the selected worker.

11. The non-transitory computer readable medium of claim 8, wherein the instructions direct the computer system to assign the shift instances to the set of workers using dynamic programming.

12. The non-transitory computer readable medium of claim 8, wherein the instructions direct the computer system to adjust shift assignments by directing the computer system to:
   determine the presence of an unassigned shift instance on a given day;
   determine the presence of an underutilized worker as compared to the per-interval maximum associated with the classification of the corresponding worker; and
   assign the unassigned shift instance to the underutilized worker, 13. The non-transitory computer readable medium of claim 12, wherein the instructions direct the computer system to adjust shift assignments by further directing the computer system to:
   determine the presence of a shift instance assigned to the underutilized worker on the given day; and
   swap the shift instance assigned to the underutilized worker on the given day with another shift instance assigned to another worker on a different day.

14. The non-transitory computer readable medium of claim 8, wherein the instructions direct the computer system to conditionally adjust shift assignments based on a number of unassigned shifts by directing the computer system to:
   determine the presence of an unassigned shift instance on a given day;
   determine the presence of an underutilized worker as compared to the per-interval maximum associated with the classification of the corresponding worker; and
   assign the unassigned shift instance to the underutilized worker.

* * * * *